United States Patent [19]

Boileau et al.

[11] 4,292,421

[45] Sep. 29, 1981

[54] ANIONIC POLYMERIZATION INITIATORS BASED ON ALKALI METAL AMIDES IN COMBINATION WITH ALKALI METAL SALTS AND ANIONIC POLYMERIZATION PROCESS USING THESE INITIATORS

[75] Inventors: Sylvie L. Boileau, Paris; Paul J. Caubère, Nancy; Serge F. Raynal, Draveil; Serge L. Lecolier, Janville sur Juine; Gilberte N. N'Debeka, Vandoeuvre, all of France

[73] Assignee: Societe Nationale des Poudres et Explosifs, Paris, France

[21] Appl. No.: 46,192

[22] Filed: Jun. 6, 1979

[30] Foreign Application Priority Data

Jul. 6, 1978 [FR] France .................................. 78 20220

[51] Int. Cl.$^3$ .................... C08F 4/08; C08F 112/08; C08F 112/34; C08F 120/14
[52] U.S. Cl. .................................. 526/220; 526/234; 526/236; 526/329.2; 526/329.7; 526/335; 526/341; 526/346; 526/347.1
[58] Field of Search .................. 526/220, 236, 234

[56] References Cited

U.S. PATENT DOCUMENTS

| | | | |
|---|---|---|---|
| 3,006,894 | 10/1961 | Evans et al. | 526/236 |
| 3,642,734 | 2/1972 | Cheng et al. | 526/236 |

*Primary Examiner*—Harry Wong, Jr.
*Attorney, Agent, or Firm*—Bucknam and Archer

[57] ABSTRACT

The invention relates to an anionic polymerization process using an initiator based on an alkali metal amide in combination with an alkali metal salt, as well as to the polymers obtained by this process.

The polymerization process according to the invention is characterized in that an initiator is used which results from the combination of an alkali metal amide selected from the group comprising sodium amide, potassium amide or lithium amide and an alkali metal salt of which the cation is selected from the group comprising potassium, lithium or sodium, the anion being selected from the group comprising the thiocyanate, nitrite, cyanide and cyanate anions.

These initiators make it possible to carry out the anionic polymerization or vinyl, heterocyclic and diene monomers in order to obtain special polymers or widely used polymers, with great adaptability and under advantageous economic conditions.

5 Claims, No Drawings

ANIONIC POLYMERIZATION INITIATORS BASED ON ALKALI METAL AMIDES IN COMBINATION WITH ALKALI METAL SALTS AND ANIONIC POLYMERIZATION PROCESS USING THESE INITIATORS

The present invention relates to new initiator systems for anionic polymerisation, to an anionic polymerisation process using these initiators and to the polymers obtained by this process.

The first anionic polymerisations were carried out by Wurz with ethylene oxide. However, it is especially Ziegler who deserves the credit for the explanation of the anionic polymerisation mechanism.

In this connection, it is necessary to distinguish clearly between pure anionic polymerisation, which is involved throughout the text which follows, and coordinated anionic polymerisation, which employs initiators such as salts of aluminium, of antimony and of the transition metals (for example the so-called Ziegler-Natta two-metal catalysts) and which has no bearing on the field in which the invention applies.

It has been known for a number of years that it is possible to polymerise lactones and lactams using sodium amide as the polymerisation initiator (German Pat. No. 1,960,385 and German Pat. No. 2,111,545).

Equally, Sigwalt et al. (C.R. Acad. Sci., Volume 252, pages 882–884, Session of Feb. 6, 1961) have shown that sodium amide initiates the polymerisation of propylene sulphide.

Unfortunately, the efficiency of the amide as an initiator is confined to particular monomers, especially to very easily polymerisable heterocyclic compounds such as propylene sulphide, the lactones or the lactams.

Furthermore, it has been shown by Sanderson and Hauser (JACS 71, 1595 (1949)) that it is possible to polymerise styrene using an alkali metal amide in liquid ammonia as the anionic polymerisation initiator.

Unfortunately, apart from the fact that this process suffers from the major disadvantage that it is carried out under conditions which are not industrially viable (a reaction temperature of between −30° and −70° C.), the presence of ammonia causes the premature and random termination of the polymerisation.

Other authors (German Pat. No. 2,365,439) have found that it is possible to upgrade the alkali metal amide by means of sulphoxides such as:

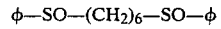

in which $\phi$ represents a phenyl nucleus.

However, once again the complexes of the latter only give good results with easily polymerisable monomers such as propylene sulphide.

Furthermore, these complexes are prepared under conditions which are not industrially viable (at −70° C., in liquid ammonia, followed by reaction for 10 hours at −45° C.).

Applicants has now discovered anionic polymerisation initiators which make it possible to overcome the abovementioned disadvantages and which result from the combination, in the presence of a solvent, of an alkali metal amide selected from the group comprising sodium amide, potassium amide or lithium amide and an alkali metal salt of which the cation is selected from the group comprising potassium, lithium or sodium and the anion is selected from the group comprising the thiocyanate, nitrite, cyanide or cyanate anions, the molar ratio of alkali metal amide to salt associated therewith being at least 1.

The Applicant Company has in fact found that the alkali metal salts cited above have a surprisingly pronounced upgrading effect on alkali metal amides as polymerisation initiators.

It is true that BIEHL et al. have already indicated, in *Journal of Organic Chemistry*, Volume 35, No. 7, 1970, page 2,454, that the combination of an alkali metal amide with a certain number of salts, including nitrites and thiocyanates, makes it possible to activate the amide in aryne condensation reactions, using dimethylamine as the solvent.

However, if the activity of a combination such as sodium amide/sodium nitrite is tested using the combination as a basic catalyst for the formation reaction of the triphenylmethyl anion from triphenylmethane in THF, which is known to be a good anionic polymerisation solvent, it is found that this combination is hardly more active than sodium amide used by itself.

It should furthermore be noted that in the organic chemistry reactions which have just been considered, a large amount of basic catalyst relative to the reactants themselves is used.

According to a preferred variant of the invention, from 1.5 to 3 mols of alkali metal amide are used per mol of alkali metal salt associated therewith. However, it is equally possible to use a large excess of amide over the salt associated therewith; for example, it is possible to use up to ten mols of amide per mol of salt associated therewith.

The solvents which can be used to prepare the initiators according to the invention must be aprotic and can be polar, slightly polar or even non-polar. It is possible to use polar solvents to the extent that their structure does not make them susceptible to the action of the complex bases used according to the invention. Thus, hexamethyl-phosphotriamide (HMPT) can be used up to about 25° C. but, for example, dimethylsulphoxide (DMSO), dimethylformamide (DMF) and N-methylpyrrolidone are degraded by the complex bases and should preferably be avoided. The polar solvents are from every point of view of little economic and industrial value in the field concerned by the invention. Other aprotic solvents of markedly lower polarity can be used, for example pyridine ($\epsilon=12.3$ at 25° C.), though they can suffer degradation after a certain time, especially if the temperature is somewhat elevated.

The aprotic solvents of low polarity (of dielectric constant <10 at 25° C.) are particularly suitable for the preparation of the initiators according to the invention. Thus, linear or cyclic ethers and polyethers, such as tetrahydrofurane (THF) and dimethoxyethane (DME), give good results, generally within a very short time. The glymes are also suitable.

However, and this is a considerable advantage, the initiators according to the invention, can also be prepared easily in a non-polar solvent which can be the same solvent as that wherein, advantageously, the subsequent polymerisation is carried out. Thus it is possible to use alkanes or cycloalkanes such as hexane, heptane or cyclohexane, or arenes such as benzene or toluene.

If solvents containing ether bridges are used, it is important carefully to remove the oxygen and peroxides present, by means of known methods.

According to a second variant of the invention, the initiators are prepared using the monomer to be polymerised as the solvent. In this case, the polymerisation is carried out in bulk.

It has in fact been discovered, and this is another surprising aspect of the present invention, that the initiators according to the invention can be prepared in the absence of any solvent other than the monomer itself and that it is possible to do so without significant change in the activity of the initiator.

The initiators according to the invention can be prepared with the aid of several substantially equivalent methods because what is involved is bringing together the alkali metal amide and the associated salt in a solvent.

For example, it is possible first to introduce the solvent into the reactor, whilst stirring, then to introduce the alkali metal amide and finally to introduce the associated salt.

It is also possible to add a suspension of the alkali metal amide in a solvent to a solution-suspension of the associated salt in the same solvent or in a solvent miscible therewith.

Alternatively, the associated salt and the amide can be introduced into the reactor and the solvent can then be poured on top.

The alkali metal amide is preferably employed ground, in the form of particles whose mean size depends on the size of the polymerisation reactor, the size of the particles being preferably larger when the size of the reactor is itself large. Grinding can be effected in the presence of a small amount of an aprotic solvent of low polarity.

The alkali metal amide used can be of analytical grade or of commercial purity. It can contain a certain amount of sodium hydroxide, provided this proportion is sufficiently well known so that the initiator can be prepared with the proportions of reactants proposed above.

As regards moisture, the latter should be removed from the reactants, solvents and apparatuses used. However, it should be noted that the cost of sodium amide makes it possible to employ less thorough drying than in the preparation of the known initiators. In fact, the use of a slight excess of alkali metal amide makes it possible to remove traces of moisture quite sufficiently by reaction of the said amide with the said traces of moisture, thereby forming products which do not interfere with the initiator formation reaction or subsequently with the polymerisation reaction.

The initiator formation reaction is advantageously carried out, in certain cases, in the reactor which subsequently serves for the polymerisation, because this makes it possible to reduce the introduction of water into the apparatus. This reaction is preferably carried out at a temperature of 20° to 60° C. It is possible to use a lower temperature but the formation reaction becomes correspondingly longer and ultimately in general ceases below 0° C. It is also possible to work at a higher temperature, but in that case the danger of degradation of the alkali metal amide or of the solvent increases. It is advisable to stir the mixture.

In the majority of cases, the duration of the initiator formation reaction is at least one hour but does not exceed 4 hours. However, much longer heating may prove necessary in difficult cases.

Finally, it should be noted that the initiators according to the invention exhibit an adaptability in use which is rarely found with the previously known initiators. In fact, if, for reasons of convenience or necessity the initiator must be prepared in a solvent which is not the same as that wherein the polymerisation is subsequently carried out, difficulties are subsequently generally encountered. In fact, the polarity of the medium is affected and, for example, the micro-structure of the polymer obtained does not conform to what is expected. In contrast, the initiators according to the invention can be prepared in a first solvent, for example a solvent of low polarity, after which the said solvent is evaporated under an almost complete vacuum, and finally a second solvent, for example a non-polar solvent, in which it is desired to carry out the polymerisation, is introduced over the initiator, the properties of which have remained preserved. The invention thus makes it possible to achieve predetermined ideal conditions for carrying out the polymerisation.

Furthermore, it must be clearly recognised that the formation of the initiators according to the invention is not accompanied by any evolution of gas which could create an unnecessary or even objectionable excess pressure in the reactor. Furthermore, the initiators according to the invention are easy to prepare because the starting materials from which they are produced are in the solid state. Finally, no organic peroxide, the presence of which is extremely undesirable in activated anionic polymerisation, can result from the introduction of the associated salts, which would not normally contain a peroxide.

As with all anionic polymerisations, it is desirable to use dry reactants, dry solvents and dry apparatuses. However, this limitation, which determines the outcome of the polymerisation, applies less strictly when using the process according to the invention in view of the property of the alkali metal amide, a low cost product, of reacting with traces of moisture to give products which do not interfere with the course of the reaction.

The reaction can be terminated in a known manner, for example by introducing a protonising agent such as an alcohol (methanol or hexanol). The reaction medium is subsequently precipitated in methanol or hexane.

Purification of the solvents and of the reactants is obviously desirable. The solvents, which are the same as those wherein the complex base can be formed, and which in particular comprises the solvents of dielectric constant less than or equal to 10 at 25° C., are purified in a manner known to polymerisation specialists. Thus, for example, a distillation over solid sodium hydroxide or potassium hydroxide, followed by a distillation over sodium, can be carried out, finally finishing by drying the solvent over sodium wires. The monomers, for their part, are purified in a known and usual manner, which depends on the nature of the monomers and which can range from simple distillation to double distillation over molecular sieves, calcium hydride, an alkali metal or even a living polymer (polyisopropenyl-lithium).

The invention also relates to a polymerisation process characterised in that an initiator such as has just been described is used.

The polymerisation process according to the invention thus consists in using as the initiator the combination of an alkali metal amide with a salt selected from the group comprising the alkali metal nitrites, cyanates, thiocyanates and cyanides, in the absence or presence of a solvent.

The process according to the invention is particularly, but not uniquely, of value when an alkali metal nitrite or thiocyanate is used as the associated salt. It has in fact been discovered that for a given alkali metal amide and a given alkali metal of the associated salt, the effectiveness of the initiator increases in the sequence $$CN^- < OCN^- < SCN^- \simeq NO_2^-$$

This is a particularly surprising result if account is taken of the fact that, on the one hand, Biehl et al. (op. cit.) have only shown the ability of certain salts to boost alkali metal amides in the case of a particular reaction of organic chemistry, and only in the presence of solvents (dimethylamine) unsuitable for anionic polymerisation, and that, on the other hand, one of the preferred salts in the process according to the invention proves virtually ineffective in another reaction (triphenylmethane test) which is carried out in THF, which is one of the preferred solvents for anionic polymerisation. Anyone skilled in anionic polymerisation thus had to doubt the possibility of applying the combinations according to the invention in his field and was in no case able to foresee their good efficiency. This is all the more so since the low activity of the combinations according to the invention in the media required for the polymerisation could only be aggravated by the fact that in anionic polymerisation it is necessary to use amounts of basic initiators which are at least 1,000 times lower than in the reactions of synthetic organic chemistry.

It is also possible to combine the alkali metal amide with a mixture of activators, the respective proportions of which can vary substantially without affecting the result of the polymerisation reaction.

Furthermore, it has also been found advantageous, in particular as regards the yield, to combine an alkali metal amide with a salt of a different alkali metal. This is all the more the case if the difference between the ionic radii of the cations is large.

However, in general the selection of different cations has less influence than the selection of the associated anion.

On the other hand, the advantageous effects resulting from the selection of different cations and of preferred anions (nitrite or thiocyanate) are generally cumulative.

In fact, the preferred variants of the process according to the invention consist in using one of the following initiators:

NaHN$_2$, NaNO$_2$
NaNH$_2$, NaSCN
KNH$_2$, KNO$_2$
KNH$_2$, KSCN
NaNH$_2$, KNO$_2$
NaNH$_2$, KSCN
KNH$_2$, NaNO$_2$
KNH$_2$, NaSCN
LiNH$_2$, KSCN
LiNH$_2$, KNO$_2$

The monomers to which the invention is applicable are, as has already been stated, those of which it is known that they undergo polymerisation by a purely anionic mechanism or, to put it another way, which are capable of polymerising anionically by the opening of an ethylenic double bond or of a heterocyclic ring. Bearing in mind that the first anionic polymerisations date back more than a century, it will be seen that the list of these monomers is very long and that this mechanism is very well known. However, it must be clearly appreciated that this mechanism is the same regardless of whether the monomer is a heterocyclic compound or whether it exhibits ethylenic unsaturation or aldehyde unsaturation (which can be considered as a two-atom heterocyclic structure), because the initiation gives rise, by scission of a bond, to the formation of an active centre which, regardless of the nature of the atom which carries the negative charge, attacks a fresh molecule of monomer which in turn carries the negative charge and so on, until the monomer is exhausted or the reaction is terminated. On this subject, reference may be made, for example, to the work by Professor Georges Champetier "Chimie Macromoleculaire" ("Macromolecular Chemistry"), Volume I, Editions Hermann, Paris (1969).

However, the following monomers may be mentioned as relevant monomers, without pretending that this list is exhaustive:

In the case of vinyl monomers, those of the general formula

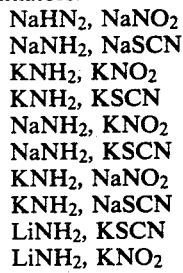

$R_1 = R_2 = R_3 = H$ and $R_4 =$ alkyl

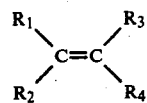

where $X = H$, Cl, $-OCH_3$ or $-C(CH_3)_3$

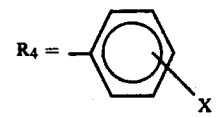, $-C \equiv N$, $-\underset{\underset{O}{\|}}{C}-O-R'$ (where $R' =$ alkyl or cycloalkyl), or $$-\underset{\underset{O}{\|}}{C}-R''$$

(where $R'' =$ alkyl)

$$R_4 = O-\underset{\underset{O}{\|}}{C}-O-R$$

(where
R = alkyl, especially methyl, or aryl, especially phenyl), or
$R_1 = R_2 = H$,
$R_3 = -CH_3$ and
$R_4 =$ phenyl, cyano or $$-\underset{\underset{O}{\|}}{C}-OR'$$

($R' =$ alkyl or cycloalkyl).

In the case of the heterocyclic monomers, the alkylene oxides, the alkylene sulphides, the lactones, the lactams, the thiethanes and the cyclic carbonates, such as ethylene oxide, propylene oxide, propylene sulphide, β-propiolactone, ε-caprolactone, pivalolactone, ε- caprolactam, propylene glycol carbonate, neopentyl-glycol carbonate and the like.

In the case of the conjugated diene monomers, those of the general formula:

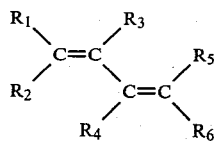

where:
$R_1=R_2=R_3=R_4=R_5=R_6=H$ (1,3-butadiene)
$R_1=R_2=R_4=R_5=R_6=H$ and $R_3=$alkyl or aryl
$R_1=R_2=R_3=R_4=R_5=H$ and $R_6=$alkyl, aryl, nitrile or nitro
$R_1=R_2=R_5=R_6=H$ and $R_3=R_4=-CH_3$
$R_1=CH_3$ and $R_2=R_3=R_4=R_5=R_6=H$ or alkyl
$R_1=R_3=R_4=R_5=H$ and $R_1=R_6=$phenyl In the case of the dienes with ethylenic double bonds which are not directly conjugated: divinylbenzene, substituted cyclohexadienes such as 3,3,6,6-tetramethyl-1,2,4,5-hexadiene and vinyl or allyl carbonates of polyols or of polyether-polyols, such as allyl-diglycol carbonate.

The process according to the invention is applicable to homopolymerisation reactions and to copolymerisation reactions, either of monomers of the same family or of monomers of different families.

The polymerisation process according to the invention is carried out under conventional conditions as regards the atmosphere which must be present in the reactor; thus, the reaction is carried out in vacuo or under an atmosphere of an inert gas such as nitrogen or argon.

The temperature at which the polymerisation is carried out is not necessarily the same as that at which the initiator has been prepared, and can be between $-80°$ C. and $+70°$ C.

Furthermore, the temperature can be varied during the polymerisation, and this is of particular value in copolymerisations which are carried out to give a certain distribution of copolymerised species or a particular microstructure or more rapid reaction kinetics.

The amount of initiator required by the process obviously depends generally on the mean molecular weight which it is desired to achieve. For example a molar ratio of amide/monomer of the order of 0.1 to 1% can be used, but it should be emphasised that a higher ratio can be used, all the more so since the amide is relatively inexpensive.

The duration of the polymerisation reaction depends on a very large number of factors and varies from a few seconds to 24 and even 48 hours.

In the examples which follow, and which are given by way of illustration of the invention and must not be considered as limiting the scope of the latter, particular emphasis has been given to the variety of possibilities offered by the initiators according to the invention, as well as to the numerous variants of the process which are mentioned in the preceding description. Other aspects which integrally form part of the invention are also described in the said examples below.

EXAMPLE OF PREPARATION OF THE INITIATORS

A reaction flask which has been dried beforehand is swept with argon, and $25 \times 10^{-3}$ mol of $NaNH_2$ and $16.6 \times 10^{-3}$ mol of an alkali metal salt ($NaNO_2$, NaSCN, NaCN or KSCN) in 20 ml of solvent such as THF or toluene are then introduced. The whole is heated for 2 hours at 50° C. The solvent is either retained, if it is desired to carry out the anionic polymerisation in the same solvent, or is removed if it is desired to carry out the anionic polymerisation in bulk or in a different solvent.

All the initiators are prepared in accordance with the same process.

EXAMPLES 1 TO 20: ANIONIC POLYMERISATION OF STYRENE $10^{-1}$ mol of styrene is introduced into the reaction flask in which the initiator has been prepared. The solution is then heated for a given time, after which the reaction is stopped by precipitating the polymer by means of methanol. The results obtained are summarised in the tables which follow:

Table 1

The experiments were carried out in 20 ml of toluene, using sodium amide as the alkali metal amide, and an activator. R is the molar ratio of amide/activator.

| No. | ACTIVATOR | T | 0° C. | Yield | $\overline{Mn}$ | $\overline{Mp}$ | $\overline{Mp}/\overline{Mn}$ |
|---|---|---|---|---|---|---|---|
| 1 | $KNO_2$ 3mM (R = 6) | 18 h | 50° C. | 33% | 3,000 | 20,000 | 6.7 |
| 2 | NaCN 3mM (R = 6) | 18 h | 50° C. | 11% | 4,000 | 50,000 | 12 |
| 3 | NaSCN 8mM (R = 6) | 24 h | 60° C. | 5% | 13,000 | 75,000 | 6 |
| 4 | $NaNO_2$ 3mM (R = 6) | 18 h | 50° C. | 45% | 5,500 | 12,000 | 2.2 |
| 5 | NaSCN 3mM (R = 6) | 18 h | 50° C. | 49% | 3,000 | 10,000 | 3.3 |

Table 2

The experiments were carried out in 20 ml of toluene, using potassium amide as the alkali metal amide, and an activator, at a temperature of 50° C. for 18 hours. R is the molar ratio of amide/activator.

| No. | ACTIVATOR | Yield | $\overline{Mn}$ | $\overline{Mp}$ | $\overline{Mp}/\overline{Mn}$ |
|---|---|---|---|---|---|
| 6 | KCN 3mM (R = 2) | 27% | 2,650 | 5,500 | 2 |
| 7 | KOCN 3mM (R = 2) | 15% | 4,000 | 45,000 | 11 |
| 8 | KSCN 3mM (R = 2) | 30% | 4,500 | 45,000 | 10 |
| 9 | $NaNO_2$ 3mM (R = 6) | 45% | 5,600 | 11,950 | 2.1 |
| 10 | NaSCN 3mM (R = 6) | 49% | 3,000 | 9,600 | 3.2 |
| 11 | $KNO_2$ 3mM (R = 6) 33% | 3,140 | 18,900 | 6.0 | |
| 12 | NaCN 3mM (R = 6) | 11% | 4,040 | 53,150 | 3.1 |

Table 3

The experiments were carried out in 40 ml of THF, using $16 \times 10^{-3}$ mol of sodium amide and $8 \times 10^{-3}$ mol of activator, at a temperature of 50° C.

| No. | ACTI-VATOR | T | Yield | $\overline{Mn}$ | $\overline{Mp}$ | $\overline{Mp}/\overline{Mn}$ |
|---|---|---|---|---|---|---|
| 13 | KSCN | 6 h | 100% | 28,000 | 400,000 | 14 |
| 14 | NaNO$_2$ | 22 h | 100% | 12,000 | 80,000 | 6.7 |
| 15 | KNO$_2$ | 5 h | 100% | 60,000 | 650,000 | 11 |
| 16 | KCN | 24 h | 90% | 10,000 | 20,000 | 2 |
| 17 | NaCN | 24 h | 11% | 45,000 | 450,000 | 10 |
| 18 | KOCN | 20 h | 3% | 14,500 | 100,000 | 7 |
| 19 | NaSCN | 7 h 30 | 56% | 6,500 | 50,000 | 8 |
| 20 | KSCN (alone) | 24 h | 4% | 20,000 | 73,000 | 3.7 |

EXAMPLES 21 TO 47: ANIONIC POLYMERISATION OF 2-VINYLPYRIDINE

Table 4

The experiments were carried out with 10$^{-1}$ mol of 2-vinylpyridine in 20 ml of toluene, using 25×10$^{-3}$ mol of sodium amide and 12.5×10$^{-3}$ mol of activator, at a temperature of 40° C.

| No. | ACTIVATOR | T | Yield | $\overline{Mn}$ |
|---|---|---|---|---|
| 21 | NaNO$_2$ | 4 h | 50% | 4,100 |
| 22 | KNO$_2$ | 5 h | 58% | 5,600 |
| 23 | NaSCN | 18 h | 60% | 4,800 |
| 24 | KCNO | 18 h | 53% | 3,900 |
| 25 | NaCNO | 18 h | 50% | 3,000 |
| 26 | NaCN | 18 h | 39% | 2,200 |

Table 5

The experiments were carried out with 10$^{-1}$ mol of 2-vinylpyridine in 20 ml of THF, using 25×10$^{-3}$ mol of sodium amide and 12.5×10$^{-3}$ mol of activator, at a temperature of 40° C.

| No. | ACTIVATOR | t | Yield | $\overline{Mn}$ |
|---|---|---|---|---|
| 27 | NaNO$_2$ | 4 h | 60% | 4,900 |
| 28 | KNO$_2$ | 4 h | 70% | 7,300 |
| 29 | NaSCN | 18 h | 65% | 4,300 |
| 30 | KCNO | 18 h | 62% | 4,000 |
| 31 | NaCNO | 18 h | 60% | 3,700 |
| 32 | NaCN | 18 h | 57% | 3,000 |

Table 6

The experiments were carried out with 10$^{-1}$ mol of 2-vinylpyridine, without a solvent, using 25×10$^{-3}$ mol of sodium amide and 12.5×10$^{-3}$ mol of activator, at a temperature of 40° C.

| No. | ACTIVATOR | t | Yield | $\overline{Mn}$ |
|---|---|---|---|---|
| 33 | NaNO$_2$ | 1 h | 60% | 4,600 |
| 34 | KNO$_2$ | 1 h | 57% | 6,300 |
| 35 | NaSCN | 3 h | 48% | 5,000 |
| 36 | KCNO | 3 h | 52% | 4,800 |
| 37 | NaCNO | 3 h | 39% | 4,000 |
| 38 | NaCN | 5 h | 28% | 3,700 |

Table 7

The experiments were carried out with 10$^{-1}$ mol of 2-vinylpyridine, using 25×10$^{-3}$ mol of alkali metal amide and 12.5×10$^{-3}$ mol of activator in 30 ml of different solvents, at a temperature of 40° C. for 18 hours.

| No. | ACTIVATOR | SOLVENT | Yield | $\overline{Mn}$ |
|---|---|---|---|---|
| 39 | NaNO$_2$ | Hexane | 47% | 4,000 |
| 40 | NaCNO | Hexane | 40% | 3,800 |
| 41 | NaCN | Hexane | 33% | 2,900 |
| 42 | NaNO$_2$ | Pyridine | 25% | 1,700 |
| 43 | NaCN | Pyridine | 20% | 1,500 |
| 44 | NaCN | DME | 68% | 7,000 |
| 45 | NaNO$_2$ | DME | 70% | 6,700 |
| 46 | NaCNO | DME | 63% | 5,300 |

EXAMPLES 47 TO 66: ANIONIC POLYMERISATION OF α-METHYLSTYRENE

The procedure is the same as for styrene. The results obtained are summarised in the tables which follow:

Table 8

The polymerisation experiments were carried out with 10$^{-1}$ mol of α-methylstyrene in 20 ml of toluene, using 25×10$^{-3}$ mol of sodium amide and 12.5×10$^{-3}$ mol of activator, at a temperature of 40° C. for 4 hours.

| No. | ACTIVATOR | Yield | $\overline{Mn}$ |
|---|---|---|---|
| 47 | NaNO$_2$ | 45% | 450 |
| 48 | KNO$_2$ | 50% | 700 |
| 49 | NaSCN | 30% | 520 |
| 50 | KCNO | 30% | 420 |
| 51 | NaCN | 10% | 300 |
| 52 | NaCNO | 25% | 360 |
| 53 | NaCN | 9% | 310 |

Table 9

The experiments were carried out with 10$^{-1}$ mol of α-methylstyrene in 20 ml of THF, using 25×10$^{-3}$ mol of sodium amide and 12×10$^{-3}$ mol of activator, at a temperature of 40° C. for 4 hours.

| No. | ACTIVATOR | Yield | $\overline{Mn}$ |
|---|---|---|---|
| 54 | NaNO$_2$ | 40% | 600 |
| 55 | KNO$_2$ | 55% | 830 |
| 56 | NaSCN | 37% | 500 |
| 57 | KCNO | 35% | 380 |
| 58 | NaCN | 17% | 340 |
| 59 | NaCNO | 30% | 400 |
| 60 | NaCN | 23% | 335 |

Table 10

The polymerisation experiments were carried out with 10$^{-1}$ mol of α-methylstyrene, without a solvent, using 25×10$^{-3}$ mol of sodium amide and 12.5×10$^{-3}$ mol of activator, at a temperature of 40° C.

| No. | ACTIVATOR | t | Yield | $\overline{Mn}$ |
|---|---|---|---|---|
| 61 | NaNO$_2$ | 4 h | 60% | 800 |
| 62 | KNO$_2$ | 4 h | 47% | 1,200 |
| 63 | NaSCN | 18 h | 35% | 680 |
| 64 | KCNO | 18 h | 38% | 590 |
| 65 | NaCNO | 18 h | 35% | 610 |

-continued

| No. | ACTIVATOR | t | Yield | $\overline{Mn}$ |
|---|---|---|---|---|
| 66 | NaCN | 18 h | 30% | 420 |

EXAMPLES 67 TO 102: ANIONIC POLYMERISATION OF ACRYLONITRILE

The procedure is the same as for styrene. The results obtained are summarised in the tables which follow.

Table 11

The polymerisation experiments were carried out with $5 \times 10^{-2}$ mol of acrylonitrile, without a solvent, using $25 \times 10^{-3}$ mol of sodium amide and $12.5 \times 10^{-3}$ mol of activator, at a temperature of 35° C.

| No. | ACTIVATOR | t | Yield | $\overline{Mn}$ |
|---|---|---|---|---|
| 67 | NaNO$_2$ | 10 mins | 80% | 5,000 |
| 68 | KNO$_2$ | 15 mins | 88% | 5,500 |
| 69 | NaSCN | 20 mins | 75% | 4,600 |
| 70 | KCNO | 15 mins | 80% | 3,900 |
| 71 | NaCNO | 15 mins | 80% | 4,200 |
| 72 | NaCN | 20 mins | 70% | 3,800 |

Table 12

The experiments were carried out with $5 \times 10^{-2}$ mol of acrylonitrile in 20 ml of THF, using $25 \times 10^{-3}$ mol of sodium amide and $12.5 \times 10^{-3}$ mol of activator, at a temperature of 40° C.

| No. | ACTIVATOR | T | Yield | $\overline{Mn}$ |
|---|---|---|---|---|
| 73 | NaNO$_2$ | 20 mins | 100% | 6,300 |
| 74 | KNO$_2$ | 20 mins | 100% | 7,000 |
| 75 | NaSCN | 20 mins | 100% | 4,200 |
| 76 | KCNO | 1 h | 90% | 5,400 |
| 77 | NaCNO | 1 h | 90% | 4,900 |
| 78 | NaCN | 1 h | 90% | 4,700 |

Table 13

The experiments were carried out with $5 \times 10^{-2}$ mol of acrylonitrile in 20 ml of toluene, using $25 \times 10^{-3}$ mol of sodium amide and $12.5 \times 10^{-3}$ mol of activator, at a temperature of 40° C.

| No. | ACTIVATOR | T | Yield | $\overline{Mn}$ |
|---|---|---|---|---|
| 79 | NaNO$_2$ | 30 mins | 90% | 4,000 |
| 80 | KNO$_2$ | 30 mins | 88% | 4,700 |
| 81 | NaSCN | 40 mins | 80% | 3,800 |
| 82 | KCNO | 1 h | 87% | 2,900 |
| 83 | NaCNO | 1 h | 79% | 3,300 |
| 84 | NaCN | 2 h | 63% | 2,400 |

Table 14

The experiments were carried out with $5 \times 10^{-2}$ mol of acrylonitrile in 20 ml of THF, using $25 \times 10^{-3}$ mol of LiNH$_2$ and $12.5 \times 10^{-3}$ mol of activator, at a temperature of 40° C. for 18 hours.

| No. | ACTIVATOR | Yield | $\overline{Mn}$ |
|---|---|---|---|
| 85 | NaSCN | 20% | 2,700 |
| 86 | NaNO$_2$ | 25% | 5,200 |
| 87 | KCNO | 17% | 4,300 |
| 88 | KNO$_2$ | 35% | 6,200 |
| 89 | NaCNO | 15% | 4,000 |
| 90 | NaCN | 10% | 2,500 |

Table 15

The experiments were carried out with $5 \times 10^{-2}$ mol of acrylonitrile, without a solvent, using $25 \times 10^{-3}$ mol of lithium amide and $12.5 \times 10^{-3}$ mol of activator, at a temperature of 40° C. for 18 hours.

| No. | ACTIVATOR | Yield | $\overline{Mn}$ |
|---|---|---|---|
| 91 | NaSCN | 38% | 5,800 |
| 92 | NaNO$_2$ | 40% | 6,400 |
| 93 | KCNO | 45% | 7,000 |
| 94 | KNO$_2$ | 68% | 9,300 |
| 95 | NaCNO | 40% | 6,000 |
| 96 | NaCN | 22% | 2,900 |

Table 16

The experiments were carried out with $5 \times 10^{-2}$ mol of acrylonitrile in 20 ml of toluene, using $25 \times 10^{-3}$ mol of lithium amide and $12.5 \times 10^{-3}$ mol of activator, at a temperature of 40° C. for 18 hours.

| No. | ACTIVATOR | Yield | $\overline{Mn}$ |
|---|---|---|---|
| 97 | NaSCN | 20% | 4,000 |
| 98 | NaNO$_2$ | 15% | 2,900 |
| 99 | KCNO | 12% | 3,600 |
| 100 | KNO$_2$ | 28% | 4,200 |
| 101 | NaCNO | 10% | 3,200 |
| 102 | NaCN | 7% | 1,850 |

EXAMPLES 103 TO 114: POLYMERISATION OF METHYL METHACRYLATE

The procedure is the same as for styrene. The results obtained are summarised in the table which follow.

Table 17

The experiments were carried out with $10^{-1}$ mol of methyl methacrylate in 30 ml of THF, using $25 \times 10^{-3}$ mol of sodium amide and $12.5 \times 10^{-3}$ mol of activator, at a temperature of 35° C.

| No. | ACTIVATOR | Time | Yield % | $\overline{Mn}$ | $\overline{Mp}$ | $\overline{Mn}/\overline{Mp}$ |
|---|---|---|---|---|---|---|
| 103 | NaNO$_2$ 12.5 × 10$^{-3}$ mol | 18 h | 100 | 14,000 | 22,000 | 1.56 |
| 104 | KNO$_2$ 12.5 × 10$^{-3}$ mol | 2 h | 100 | 12,400 | 25,700 | 2.1 |
| 105 | NaSCN 12.5 × 10$^{-3}$ mol | 3 h | 100 | 10,000 | 25,000 | 2.5 |
| 106 | KCNO 12.5 × 10$^{-3}$ mol | 1½ h | 100 | 41,100 | 109,300 | 2.66 |

Table 18

The experiments were carried out with $10^{-1}$ mol of methyl methacrylate in 30 ml of toluene, using $25\times10^{-3}$ mol of sodium amide and $12.5\times10^{-3}$ mol of activator, at a temperature of 35° C.

| No. | ACTIVATOR | Time | Yield % | $\overline{Mn}$ | $\overline{Mp}$ | $\overline{Mn}/\overline{Mp}$ |
|---|---|---|---|---|---|---|
| 107 | NaNO$_2$ 12.5 × 10$^{-3}$ mol | 2 h | 100 | 41,000 | 195,600 | 4.77 |
| 108 | KNO$_2$ 12.5 × 10$^{-3}$ mol | 2 h | 100 | 27,700 | 82,600 | 2.98 |
| 109 | NaSCN 12.5 × 10$^{-3}$ mol | 2 h | 100 | 19,000 | 87,000 | 1.95 |
| 110 | KCNO 12.5 × 10$^{-3}$ mol | 1½ h | 100 | 61,600 | 254,400 | 4.13 |

Table 19

The experiments were carried out with $10^{-1}$ mol of methyl methacrylate, without a solvent, using $25\times10^{-3}$ mol of sodium amide and $12.5\times10^{-3}$ mol of activator.

| No. | ACTIVATOR | °C. | Time | Yield % | $\overline{Mn}$ | $\overline{Mp}$ | $\overline{Mn}/\overline{Mp}$ |
|---|---|---|---|---|---|---|---|
| 111 | NaNO$_2$ 12.5 × 10$^{-3}$ mol | 35 | 45 mins | 100 | 33,600 | 113,000 | 3.36 |
| 112 | KNO$_2$ 12.5 × 10$^{-3}$ mol | 40 | 30 mins | 100 | 24,600 | 45,600 | 1.86 |
| 113 | NaSCN 12.5 × 10$^{-3}$ mol | 40 | 55 mins | 100 | 13,700 | 24,500 | 1.79 |
| 114 | KCNO 12.5 × 10$^{-3}$ mol | 35 | 15 mins | 100 | 47,000 | 138,400 | 2.95 |

Microstructure determinations were carried out on the product which results from the polymerisation of methyl methacrylate using sodium amide and an associated salt as the initiator.

The results are shown in the table below.

Table 20

| ACTIVATOR | SOLVENT | NMR T | NMR H | NMR S |
|---|---|---|---|---|
| NaNO$_2$ | THF | 11.8 | 56.6 | 31.5 |
| NaSCN | THF | 21.1 | 53.9 | 25.0 |
| NaNO$_2$ | Toluene | 36.5 | 44 | 19.5 |
| KNO$_2$ | Toluene | 26.5 | 52.1 | 21.4 |
| KCNO | Toluene | 22.4 | 51.7 | 25.9 |

EXAMPLES 115 TO 140: POLYMERISATION OF METHACRYLONITRILE

The procedure is the same as for styrene. The results obtained are summarised in the tables which follow.

Table 21

The experiments were carried out with $10^{-1}$ mol of methacrylonitrile in 30 ml of THF, using $25\times10^{-3}$ mol of sodium amide and $12.5\times10^{-3}$ mol of activator, at a temperature of 35° C.

| No. | ACTIVATOR | °C. | Time | Yield % | $\overline{Mn}$ |
|---|---|---|---|---|---|
| 115 | NaNO$_2$ 12.5 × 10$^{-3}$ mol | 35 | 10 mins | 100 | 20,000 |
| 116 | KNO$_2$ 12.5 × 10$^{-3}$ mol | 35 | 15 mins | 90 | 16,000 |
| 117 | NaSCN 12.5 × 10$^{-3}$ mol | 35 | 30 mins | 80 | 12,000 |
| 118 | KCNO 12.5 × 10$^{-3}$ mol | 35 | 10 mins | 90 | 17,000 |

Table 22

The polymerisation experiments were carried out with $10^{-1}$ mol of methacrylonitrile in 30 ml of toluene, using $25\times10^{-3}$ mol of sodium amide and $12.5\times10^{-3}$ mol of activator, at a temperature of 35° C.

| No. | ACTIVATOR | Time | Yield % | $\overline{Mn}$ |
|---|---|---|---|---|
| 119 | NaNO$_2$ 12.5 × 10$^{-3}$ mol | 20 mins | 85 | 18,000 |
| 120 | KNO$_2$ 12.5 × 10$^{-3}$ mol | 35 mins | 98 | 14,000 |
| 121 | NaSCN 12.5 × 10$^{-3}$ mol | 30 mins | 95 | 10,000 |
| 122 | KCNO 12.5 × 10$^{-3}$ mol | 30 mins | 90 | 12,500 |

Table 23

The experiments were carried out with $10^{-1}$ mol of methacrylonitrile, without a solvent, using $25\times10^{-3}$ mol of sodium amide and $12.5\times10^{-3}$ mol of activator, at a temperature of 35° C.

| No. | ACTIVATOR | Time | Yield % | $\overline{Mn}$ |
|---|---|---|---|---|
| 123 | KNO$_2$ 12.5 × 10$^{-3}$ mol | 5 mins | 100 | 38,000 |
| 124 | KCNO 12.5 × 10$^{-3}$ mol | 15 mins | 100 | 32,000 |
| 125 | NaNO$_2$ 12.5 × 10$^{-3}$ mol | 10 mins | 100 | 29,000 |
| 126 | NaSCN 12.5 × 10$^{-3}$ mol | 20 mins | 100 | 35,000 |

Table 24

The experiments were carried out with $5\times10^{-2}$ mol of methacrylonitrile, without a solvent, using $25\times10^{-3}$ mol of lithium amide and $12.5\times10^{-3}$ mol of activator, at a temperature of 40° C. for 8 hours.

| No. | ACTIVATOR | Yield % | $\overline{Mn}$ |
|---|---|---|---|
| 127 | NaSCN | 40 | 6,000 |
| 128 | NaNO$_2$ | 48 | 7,200 |
| 129 | KNO$_2$ | 75 | 10,500 |
| 130 | NaCNO | 45 | 6,300 |
| 131 | NaCN | 30 | 3,200 |
| 132 | KCNO | 50 | 8,100 |

Table 25

The experiments were carried out with $5\times10^{-2}$ mol of methacrylonitrile in 20 ml of solvent, using $25\times10^{-3}$ mol of lithium amide and $12.5\times10^{-3}$ mol of activator, at a temperature of 40° C. for 18 hours.

| No. | ACTIVATOR | SOLVENT | Yield % | $\overline{Mn}$ |
|---|---|---|---|---|
| 133 | NaSCN | THF | 25 | 3,000 |
| 134 | NaNO$_2$ | THF | 28 | 6,200 |
| 135 | KCNO | THF | 19 | 5,100 |
| 136 | KNO$_2$ | THF | 40 | 73,000 |
| 137 | NaSCN | Toluene | 23 | 4,300 |
| 138 | NaNO$_2$ | Toluene | 16 | 3,700 |
| 139 | KCNO | Toluene | 14 | 4,000 |
| 140 | KNO$_2$ | Toluene | 30 | 5,000 |

EXAMPLES 141 TO 152: POLYMERISATION OF ISOPRENE

The procedure is the same as for styrene. The results are summarised in the tables below.

Table 26

The experiments were carried out with $10^{-1}$ mol of isoprene in 20 ml of THF, using $25\times10^{-3}$ mol of sodium amide and $12.5\times10^{-3}$ of activator, at a temperature of 40° C. for 18 hours.

| No. | ACTIVATOR | Yield | $\overline{Mn}$ |
|---|---|---|---|
| 141 | KNO$_2$ | 12% | 1,500 |
| 142 | NaNO$_2$ | 10% | 800 |
| 143 | KCNO | 10% | 1,000 |
| 144 | NaCNO | 9% | 1,300 |
| 145 | NaSCN | 10% | 1,200 |
| 146 | NaCN | 5% | 1,100 |

Table 27

The experiments were carried out with $10^{-1}$ mol of isoprene, without a solvent, using $25\times10^{-3}$ mol of sodium amide and $12.5\times10^{-3}$ mol of activator, at a temperature of 40° C. for 18 hours.

| No. | ACTIVATOR | Yield | $\overline{Mn}$ |
|---|---|---|---|
| 147 | KNO$_2$ | 10% | 2,500 |
| 148 | NaNO$_2$ | 10% | 2,000 |
| 149 | KCNO | 10% | 1,500 |
| 150 | NaCNO | 10% | 1,300 |
| 151 | NaSCN | 10% | 1,400 |
| 152 | NaCN | 10% | 900 |

EXAMPLES 153 to 158: POLYMERISATION OF HETEROCYCLIC COMPOUNDS

Table 28

The experiments were carried out using $25\times10^{-3}$ mol of sodium amide and $12.5\times10^{-3}$ mol of activator.

| No. | Monomer | Activator | Solvent | t | 0° C. | Yield | $\overline{Mn}$ |
|---|---|---|---|---|---|---|---|
| 153 | ethylene oxide 0.19 mol | NaNO$_2$ | toluene 30 ml | 18 h | 40° C. | 100% | 6,000 |
| 154 | ethylene oxide 0.20 mol | NaNO$_2$ | — | 18 h | 25° C. | 100% | 4,500 |
| 155 | cyclic carbonate of 2-ethyl-2-butyl-propane-1,3-diol $5.4\times10^{-2}$ mol | NaSCN | — | 2 h | 25° C. | 100% | 10,000 |
| 156 | cyclic carbonate of 2-methyl-2-propyl-propane-1,3-diol $6.3\times10^{-2}$ mol | NaSCN | toluene | 24 h | 25° C. | 100% | 6,800 |

The experiments carried out with propylene oxide, using $25\times10^{-3}$ mol of sodium amide and $12.5\times10^{-3}$ mol of sodium cyanide for 48 hours at 25° C. show a substantial increase in the molecular weight. The results are summarised in Examples 161 and 162.

| | SOLVENT | $\overline{Mn}$ |
|---|---|---|
| Example 157 | THF 20 ml | 7,500 |
| Example 158 | without solvent | 12,500 |

EXAMPLES 159 to 163: ANIONIC POLYMERISATION CARRIED OUT USING, AS THE INITIATOR, AN ALKALI METAL AMIDE AND A MIXTURE OF ASSOCIATED SALTS

Table 29

The procedure is the same as for styrene. The results are summarised in the table below.

The experiments were carried out with $10^{-1}$ mol of methyl methacrylate, in a solvent or without a solvent, using $25\times10^{-2}$ mol of lithium amide and a mixture of associated salts as the activator, at a temperature of 40° C.

| No. | ACTIVATOR | SOLVENT | T | Yield | $\overline{Mn}$ |
|---|---|---|---|---|---|
| 159 | NaSCN + NaNO$_2$ $6\times10^{-3}$  $6\times10^{-3}$ | THF | 18 h | 25% | 4,500 |
| 160 | NaSCN + NaCNO $2\times10^{-3}$  $10^{-3}$ | THF | 18 h | 23% | 5,000 |
| 161 | KNO$_2$ + KCNO $5\times10^{-3}$  $7\times10^{-3}$ | Toluene | 18 h | 22% | 4,500 |
| 162 | KNO$_2$ + NaCN $9\times10^{-3}$  $3\times10^{-3}$ | Toluene | 18 h | 25% | 3,900 |
| 163 | KNO$_2$ + NaCNO | — | 8 h | 30% | 4,500 |

-continued

| No. | ACTIVATOR | SOLVENT | T | Yield | $\overline{Mn}$ |
|---|---|---|---|---|---|
| | $5 \times 10^{-3}$ | $7 \times 10^{-3}$ | | | |

EXAMPLES 164 to 175: ANIONIC POLYMERISATION IN THE ABSENCE OF AN ALKALI METAL AMIDE

The procedure is the same as for styrene. The results obtained are summarised in the table below.

Table 30

The experiments were carried out with $10^{-1}$ mol of methyl methacrylate in 20 ml of solvent or without a solvent, using exclusively $12.5 \times 10^{-3}$ mol of activator. All the experiments proved negative.

| | ACTIVATOR | SOLVENT |
|---|---|---|
| 164 | $NaNO_2$ | toluene |
| 165 | KCNO | toluene |
| 166 | $KNO_2$ | toluene |
| 167 | NaSCN | toluene |
| 168 | $KNO_2$ | THF |
| 169 | $NaNO_2$ | THF |
| 170 | KCNO | THF |
| 171 | NaSCN | THF |
| 172 | $KNO_2$ | — |
| 173 | $NaNO_2$ | — |
| 174 | NaSCN | — |
| 175 | KCNO | — |

EXAMPLES 176 TO 181: POLYMERISATION OF STYRENE IN TOLUENE 88 mM of styrene were polymerised, in 8 hours, in 40 ml of toluene at 40° C. in the presence of 25 mM of $NaNO_2$ and of an amount of $NaNH_2$ corresponding to the molar ratio indicated in column 2 of Table 31, which table also shows the results obtained:

Table 31

| Example | $\dfrac{NaNH_2}{NaNO_2}$ | Yield (%) | $\overline{Mn}$ * | $\overline{Mp}$ * | I * |
|---|---|---|---|---|---|
| 176 | 1 | 80 | 101,000 | 292,900 | 2.9 |
| 177 | 2 | 100 | 95,600 | 210,300 | 2.2 |
| 178 | 4 | 77 | 64,200 | 173,300 | 2.7 |
| 179 | 6 | 58 | 41,430 | 128,430 | 3.1 |
| 180 | 10 | 40 | 13,300 | 59,850 | 4.5 |
| 181 | 12 | 40 | 10,000 | 48,000 | 4.8 |

*measured by GPC at 30° C. in THF.

It is found that the best yields are obtained with a ratio of about 2 but variation of the proportion of amide provides a means of achieving an $\overline{Mn}$ of between 100,000 and 10,000.

EXAMPLES 182 TO 186: BULK POLYMERISATION OF STYRENE 88 mM of styrene were polymerised at 40° C. for one hour in the presence of 25 mM of $NaNO_2$ and of an amount of $NaNH_2$ corresponding to the molar ratio indicated in column 2 of Table 32, which table shows the results obtained.

Table 32

| Example | $\dfrac{NaNH_2}{NaNO_2}$ | Yield (%) | $\overline{Mn}$ (*) | $\overline{Mp}$ (*) | I (*) |
|---|---|---|---|---|---|
| 182 | 1 | 85 | 45,500 | 409,500 | 9 |
| 183 | 2 | 100 | 53,400 | 341,750 | 6.4 |
| 184 | 4 | 87 | 42,600 | 404,700 | 9.5 |
| 185 | 6 | 85 | 37,500 | 412,500 | 11 |
| 186 | 10 | 80 | 23,600 | 283,200 | 12 |

(*)measured by GPC at 30° C. in THF.

It is found that in bulk polymerisation, as in solution polymerisation, the highest results are obtained for a ratio of about 2 and that it is possible to vary $\overline{Mn}$ by varying the proportion of $NaNH_2$.

EXAMPLES 187 TO 193: POLYMERISATION OF STYRENE IN THF 88 mM of styrene were polymerised for 4 hours in 40 ml of THF in the presence of 8.3 mM of $NaNO_2$ and 16.7 mM of $NaNH_2$. The polymerisation was carried out at various temperatures between −80° C. and +40° C. The results obtained are shown in Table 33.

Table 33

| Example | °C. | Yield (%) | $\overline{Mn}$ (*) | $\overline{Mp}$ (*) | I (*) |
|---|---|---|---|---|---|
| 187 | 40 | 100 | 35,700 | 151,500 | 2 |
| 188 | 20 | 100 | 85,000 | 161,500 | 1.9 |
| 189 | 0 | 100 | 87,000 | 165,300 | 1.9 |
| 190 | −20 | 100 | 110,000 | 187,000 | 1.7 |
| 191 | −40 | 100 | 120,000 | 180,000 | 1.5 |
| 192 | −60 | 100 | 137,000 | 205,500 | 1.5 |
| 193 | −80 | 100 | 175,000 | 262,500 | 1.5 |

It is found that the yields are excellent at all temperatures and that when the polymerisation temperature decreases, the polydispersity index decreases whilst the molecular weights increase.

EXAMPLES 194 TO 200: POLYMERISATION OF STYRENE IN SOLUTION 88 mM of styrene were polymerised for 4 hours in the presence of 16.7 mM of $NaNH_2$ and 8.3 mM of $NaNO_2$ in various solvents. The polymerisation temperature was 40° C. (except for HMPT, where it was 20° C.). The results obtained are given in Table 34.

Table 34

| Example | Solvent | Yield (%) | $\overline{Mn}$ (c) (*) | $\overline{Mp}$ (c) (*) | I (c) (*) |
|---|---|---|---|---|---|
| 194 | HMPT (d) | 100 | 42,000 | 50,400 | 1.2 |
| 195 | THF | 100 | 75,700 | 151,500 | 1.3 |
| 196 | DME | 100 | 85,000 | 110,500 | 1.3 |
| 197 | diglyme | 100 | 123,000 | 221,400 | 1.8 |
| 198 | toluene | 45 | 55,600 | 122,300 | 2.2 |
| 199 | benzene | 40 | 41,300 | 95,000 | 2.3 |
| 200 | cyclohexane | 8 | 10,000 | 51,000 | 5.1 |

(*) measured by GPC in THF at 30° C.

It is found that the polymerisation medium is another possible means of selection of the molecular weights.

EXAMPLES 201 TO 208: BULK POLYMERISATION OF STYRENE 88 mM of styrene were polymerised for 4 hours at 40° C. (20° C. only in Example 202) in the presence of 8.3 mM of $NaNO_2$ and 16.7 mM of $NaNH_2$ and in the absence of solvent.

The initiator was prepared in various solvents which were then evaporated to dryness (Examples 202 to 208), or the monomer was simply run onto the salts which had been ground together (Example 201).

The results obtained are shown in Table 35.

Table 35

| Example | Solvent | Yield (%) | Mn (*) | Mp (*) | I |
|---|---|---|---|---|---|
| 201 | — | 100 | 173,100 | 917,450 | 5.3 |
| 202 | HMPT | 100 | 74,400 | 290,150 | 3.9 |
| 203 | THF | 100 | 133,600 | 587,850 | 4.4 |
| 204 | DME | 100 | 128,750 | 527,900 | 4.1 |
| 205 | diglyme | 100 | 141,200 | 663,650 | 4.7 |
| 206 | toluene | 95 | 103,600 | 507,650 | 4.9 |
| 207 | benzene | 98 | 101,900 | 509,500 | 5.0 |
| 208 | cyclohexane | 90 | 99,900 | 479,500 | 4.8 |

(*) measured by GPC in THF at 30° C.

EXAMPLES 209 TO 232: POLYMERISATION OF METHYL METHACRYLATE IN THF

All the polymerisations shown below were carried out at 35° C. for 2 hours in 30 ml of THF with 100 mM of methyl methacrylate in the presence of 16.7 mM of amide and 8.3 mM of associated salt.

Tables 36, 37 and 38 show the results obtained respectively with $LiNH_2$, $NaNH_2$ and $KNH_2$.

Table 36

| Example | Activator | Yield % | $\overline{Mn}$* | $\overline{Mp}$* | I* |
|---|---|---|---|---|---|
| 209 | $NaNO_2$ | 57 | 34,400 | 72,240 | 2.1 |
| 210 | NaSCN | 50 | 29,500 | 67,850 | 2.3 |
| 211 | NaCNO | 38 | 19,550 | 52,800 | 2.7 |
| 212 | NaCN | 35 | 17,500 | 43,750 | 2.5 |
| 213 | $KNO_2$ | 64 | 28,800 | 54,700 | 1.9 |
| 214 | KSCN | 59 | 24,800 | 52,100 | 2.1 |
| 215 | KCNO | 45 | 15,100 | 37,750 | 2.5 |
| 216 | KCN | 40 | 12,000 | 27,600 | 2.3 |

*measured by GPC at 30° C. in THF.

Table 37

| Example | Activator | Yield % | $\overline{Mn}$* | $\overline{Mp}$* | I* |
|---|---|---|---|---|---|
| 217 | $NaNO_2$ | 100 | 43,500 | 56,550 | 1.3 |
| 218 | NaSCN | 100 | 22,000 | 46,200 | 2.1 |
| 219 | NaCNO | 96 | 19,200 | 48,000 | 2.5 |
| 220 | NaCN | 90 | 16,200 | 38,900 | 2.4 |
| 221 | $KNO_2$ | 100 | 18,000 | 23,400 | 1.3 |
| 222 | KSCN | 100 | 15,000 | 28,500 | 1.9 |
| 223 | KCNO | 100 | 13,000 | 29,900 | 2.3 |
| 224 | KCN | 100 | 10,000 | 22,000 | 2.2 |

*measured by GPC at 30° C. in THF.

Table 38

| Example | Activator | Yield % | $\overline{Mn}$* | $\overline{Mp}$* | I* |
|---|---|---|---|---|---|
| 225 | $NaNO_2$ | 100 | 23,700 | 28,450 | 1.2 |
| 226 | NaSCN | 100 | 23,000 | 34,500 | 1.5 |
| 227 | NaCNO | 100 | 21,000 | 44,100 | 2.1 |
| 228 | NaCN | 100 | 19,000 | 34,200 | 1.8 |
| 229 | $KNO_2$ | 100 | 12,700 | 19,050 | 1.5 |
| 230 | KSCN | 100 | 11,000 | 20,900 | 1.9 |
| 231 | KCNO | 100 | 8,200 | 18,850 | 2.3 |
| 232 | KCN | 100 | 7,500 | 18,000 | 2.4 |

*measured by GPC at 30° C. in THF.

As far as is known, polymethyl methacrylate having a polydispersity index of between 1.2 and 1.6 and a number-average molecular weight of between 12,000 and 45,000 was not previously known.

EXAMPLES 233 TO 256: BULK POLYMERISATION OF STYRENE

All the polymerisations shown below were carried out at 45° C. for 2 hours, without a solvent, with 88 mM of styrene poured onto 16.7 mM of amide and 8.3 mM of associated salt which had been ground together.

Tables 39, 40 and 41 show the results respectively obtained with $LiNH_2$, $NaNH_2$ and $KNH_2$.

Table 39

| Example | Activator | Yield % | $\overline{Mn}$* | $\overline{Mp}$* | I* |
|---|---|---|---|---|---|
| 233 | $NaNO_2$ | 15 | 36,000 | 140,400 | 3.9 |
| 234 | NaSCN | 10 | 21,000 | 90,300 | 4.3 |
| 235 | NaCNO | 10 | 16,000 | 81,600 | 5.1 |
| 236 | NaCN | 7 | 9,300 | 454,500 | 4.9 |
| 237 | $KNO_2$ | 20 | 15,600 | 60,850 | 3.9 |
| 238 | KSCN | 15 | 9,300 | 38,150 | 4.1 |
| 239 | KCNO | 15 | 7,800 | 41,350 | 5.3 |
| 240 | KCN | 20 | 1,600 | 7,500 | 4.7 |

*measured by GPC at 30° C. in THF.

Table 40

| Example | Activator | Yield % | $\overline{Mn}$* | $\overline{Mp}$* | I* |
|---|---|---|---|---|---|
| 241 | $NaNO_2$ | 55 | 104,500 | 376,200 | 3.6 |
| 242 | NaSCN | 60 | 102,000 | 357,000 | 3.5 |
| 243 | NaCNO | 45 | 54,000 | 226,800 | 4.2 |
| 244 | NaCN | 40 | 42,000 | 222,600 | 5.3 |
| 245 | $KNO_2$ | 60 | 33,600 | 110,900 | 3.3 |
| 246 | KSCN | 55 | 21,450 | 87,950 | 4.1 |
| 247 | KCNO | 50 | 10,000 | 38,000 | 3.8 |
| 248 | KCN | 45 | 2,700 | 14,850 | 5.5 |

*measured by GPC at 30° C. in THF.

Table 41

| Example | Activator | Yield % | $\overline{Mn}$* | $\overline{Mp}$* | I* |
|---|---|---|---|---|---|
| 249 | $NaNO_2$ | 70 | 98,000 | 294,000 | 3.0 |
| 250 | NaSCN | 55 | 56,400 | 236,800 | 4.2 |
| 251 | NaCNO | 65 | 52,000 | 192,400 | 3.7 |
| 252 | NaCN | 50 | 31,000 | 99,200 | 3.2 |
| 253 | $KNO_2$ | 75 | 22,500 | 92,250 | 4.1 |
| 254 | KSCN | 60 | 9,600 | 30,700 | 3.2 |
| 255 | KCNO | 60 | 6,000 | 18,600 | 3.1 |

-continued

| Example | Activator | Yield % | $\overline{Mn}$* | $\overline{Mp}$* | I* |
|---|---|---|---|---|---|
| 256 | KCN | 55 | 2,750 | 10,450 | 3.8 |

*measured by GPC at 30° C. in THF.

Particularly high values of $\overline{Mn}$ were obtained.

EXAMPLE 257: COPOLYMERIZATION OF STYRENE AND METHYL METHACRYLATE IN SOLUTION

The initiator was prepared by reacting 17 mM of NaNH$_2$ with 8,5 mM of NaNO$_2$ in 100 ml of THF, during 2 hours at 40° C.

The reactor containing the initiator was cooled at −20° C. and 88 mM of styrene were then introduced on the initiator. After one hour one half of the formed polystyrene was taken. This polymer which was "killed" when a small amount of methanol, had a $\overline{Mn}$ equal to 42,500, i.e., to the theoritical $\overline{Mn}$ value.

On the second half which remained in the reactor, 20 mM of methyl methacrylate (MAM) were introduced and let polymerize during one hour, the temperature of −20° C. being still maintained. The obtained copolymer has a $\overline{Mn}$ of 58800: the poly MAM had therefore a $\overline{Mn}$ of 16300 (whereas the theoritical value was 20,000) (yield: 80%).

The $\overline{Mn}$ were measured by Gel Permeation Chromatograhy (GPC) at 30° C., in THF.

EXAMPLE 258: MASS COPOLYMERIZATION OF STYRENE AND METHYL METHACRYLATE

The initiator was prepared in the same way as in example 257 in about 50 ml of THF. The THF was then evaporated and 88 mM of styrene were introduced upon the initiator at −30° C., during one hour. One half of the formed polystyrene was taken and showed a $\overline{Mn}$ equal to 13,400 (yield 100%). On the remaining half, 100 mM of MAM were then introduced and the mixture was allowed to stand at −30° C. for one hour. The copolymer thus obtained had a $\overline{Mn}$ equal to 30 900 (theory: 46 000). The yield of the copolymerization of the MAM was 54%. The $\overline{Mn}$ were measured by Gel Permeation Chromatography at 30° C., in THF.

We claim:

1. Process for the polymerisation of vinyl or diene monomers capable of polymerising anionically by opening of an ethylenic double bond, wherein the reaction is initiated, in the presence of an aprotic solvent, by means of an initiator which is the product of the reaction of an alkali metal amide which is a member selected from the group consisting of sodium amide, potassium amide and lithium amide and at least one alkali metal salt of which the cation is a member selected from the group consisting of potassium, lithium, and sodium, the anion being a member selected from the group consisting of the thiocyanate, cyanate, cyanide and nitrite anions, in a molar ratio of alkali metal amide/associated salt at least equal to 1 up to 12.

2. Anionic polymerisation process according to claim 1, wherein the molar ratio of alkali metal amide/associated salt is between 1.5 and 3.

3. Anionic polymerisation process according to claim 1, wherein the reaction is initiated in the presence of a solvent of dielectric constant less than 10 at 25° C.

4. Anionic polymerisation process according to claim 1, 2, or 3 wherein the solvent is the monomer to be polymerised.

5. Anionic polymerisation process according to anyone of claims 1, 2, or 3 wherein the initiator is the reaction product of:
(a) NaNH$_2$ and NaNO$_2$
(b) NaNH$_2$ and NaSCN
(c) KNH$_2$ and KNO$_2$
(d) KNH$_2$ and KSCN
(e) NaNH$_2$ and KNO$_2$
(f) NaNH$_2$ and KSCN
(g) KNH$_2$ and NaNO$_2$
(h) KNH$_2$ and NaSCN
(i) LiNH$_2$ and KSCN or
(j) LiNH$_2$ and KNO$_2$.

* * * * *